US005615784A

United States Patent [19]

Pech et al.

[11] Patent Number: 5,615,784

[45] Date of Patent: Apr. 1, 1997

[54] CRANE COUNTERWEIGHT INSTALLATION AND REMOVAL APPARATUS

[75] Inventors: David Pech; Larry Schweigl, both of Manitowoc, Wis.

[73] Assignee: The Manitowoc Company, Inc., Manitowoc, Wis.

[21] Appl. No.: 315,195

[22] Filed: Sep. 29, 1994

Related U.S. Application Data

[63] Continuation of Ser. No. 926,812, Aug. 7, 1992, abandoned.

[51] Int. Cl.[6] .......... B66C 23/72; B60B 17/00; B60S 9/00

[52] U.S. Cl. .......... 212/178; 212/195; 212/308; 212/198; 104/306; 280/758

[58] Field of Search .......... 212/178, 308, 212/195–198, 175; 414/673, 685, 719; 280/757–759; 104/93, 245, 247, 306; 254/280–281, 325–327; 248/364

[56] References Cited

U.S. PATENT DOCUMENTS

| | | | |
|---|---|---|---|
| 197,645 | 11/1877 | Lyons . | |
| 524,619 | 8/1894 | Sturm | 212/198 |
| 1,068,279 | 7/1913 | Schrader | 212/196 |
| 2,325,089 | 7/1943 | Zeilman . | |
| 2,361,290 | 10/1944 | Herold | 104/306 |
| 2,689,655 | 9/1954 | Potter et al. | 212/59 |
| 2,774,484 | 12/1956 | White . | |
| 2,986,407 | 5/1961 | Krueger | 212/198 |
| 3,251,479 | 5/1966 | Lonngren | 212/49 |
| 3,955,684 | 5/1976 | Novotny | 212/178 |
| 4,042,115 | 8/1977 | Beduhn et al. | 212/48 |
| 4,103,783 | 8/1978 | Beduhn et al. | 212/48 |
| 4,273,244 | 6/1981 | Jensen et al. | 212/181 |
| 4,286,720 | 9/1981 | Atkinson | 212/178 |
| 4,336,889 | 6/1982 | McGrew | 212/178 |
| 4,729,486 | 3/1988 | Petzold et al. | 212/189 |
| 5,005,714 | 4/1991 | Kröll et al. | 212/196 |

FOREIGN PATENT DOCUMENTS

| | | | |
|---|---|---|---|
| 1053145 | 9/1953 | France | 280/758 |
| 2185579 | 1/1974 | France . | |
| 1506549 | 7/1969 | Germany . | |
| 964154 | 7/1964 | United Kingdom | 212/178 |
| 1020635 | 2/1966 | United Kingdom | 212/198 |
| 1179513 | 1/1970 | United Kingdom . | |
| 1291541 | 10/1972 | United Kingdom | 212/178 |
| 2030536 | 4/1980 | United Kingdom . | |

OTHER PUBLICATIONS

European Search Report and Annex thereto listing and commenting on the above–listed references (date: Nov. 23, 1993).

Harnischfeger Brochure for Model 6250 showing a method and apparatus for installing crane counterweights (date unknown).

FMC/Link–Belt Brochure for Model HC218 showing a hydraulic counterweight lowering system (date unknown).

General Link–Belt Brochure showing a hydraulic counterweight removal system (date unknown).

*Primary Examiner*—Karen B. Merritt
*Assistant Examiner*—R. B. Johnson
*Attorney, Agent, or Firm*—Steven P. Shurtz; Brinks Hofer Gilson & Lione

[57] ABSTRACT

A counterweight installation and removal apparatus for a truck-mounted crane includes a counterweight having a bottom surface, a plurality of rollers attached to either the bottom surface of the counterweight or to a crane carrier deck, and at least one inclined surface positioned on the other of the bottom surface of the counterweight or the crane carrier deck to engage the plurality of rollers when the counterweight is installed and removed.

15 Claims, 10 Drawing Sheets

CRANE COUNTERWEIGHT INSTALLATION AND REMOVAL APPARATUS

This application is a continuation of application Ser. No. 07/926,812, filed Aug. 7, 1992, now abandoned.

BACKGROUND OF THE INVENTION

This invention relates generally to the field of load-lifting cranes, and more particularly to a counterweight installation apparatus and method for such cranes.

A conventional method of installing counterweight on a crawler-mounted crane consists of positioning the separate counterweight sections on the ground, backing the crane upperworks up to the counterweights, lowering the gantry to allow the counterweight linkage to be attached to a counterweight section, raising the gantry and the counterweight section to a position wherein the counterweight section may be attached to the counterweight support on the rear of the crane upperworks, and attaching the counterweight section to the aforementioned counterweight support. This procedure is repeated until the desired number of counterweight sections are attached to the crane upperworks. This procedure has been used for some truck-mounted cranes as well.

A relatively new technique for installing counterweight on truck-mounted cranes was devised by Link-Belt. The Link-Belt design utilizes hydraulic cylinders with attached linkages for raising counterweight sections from a crane carrier deck. This design, as opposed to the conventional design, eliminates the need for the counterweight sections to be positioned on the ground in order to be attached to the crane upperworks. Rather, in the Link-Belt design, the counterweight sections are located on the carrier deck and the crane rotates to the location necessary for the counterweight sections to be attached to the crane upperworks (i.e., the rear of the upperworks facing the counterweight sections). The above-described hydraulic cylinder and linkage arrangement raises and attaches the desired number of counterweight sections to the crane upperworks.

While the above-described apparatuses and methods for installing and removing crane counterweight are adequate for some purposes, a more convenient counterweight installation and removal apparatus is desired for other truck-mounted cranes. Truck-mounted cranes are not as mobile as crawler-mounted cranes, and they typically are higher off the ground than crawler-mounted cranes. Therefore, the counterweight installation and removal apparatus and method of the present invention is designed to accommodate the lack of maneuverability and the height of truck-mounted cranes. Necessarily, this apparatus is designed such that the counterweight moves beyond the crane upperworks after it has been removed, so that the crane upperworks is able to rotate freely.

SUMMARY OF THE INVENTION

According to a first aspect of the present invention, a counterweight installation and removal apparatus for a crane is provided including a counterweight having a bottom surface, a plurality of rollers attached to either the bottom surface of the counterweight or to a crane carrier deck, and at least one inclined surface positioned on the other of the bottom surface of the counterweight or the crane carrier deck to engage the plurality of rollers when the counterweight is installed and removed.

According to a second aspect of the present invention, a roller and inclined bar assembly for moving a crane counterweight to a position on a crane carrier deck whereby a crane upperworks is able to freely rotate past the counterweight is provided, including a plurality of rollers attached to the bottom of the crane counterweight, and a plurality of inclined bars positioned to engage the plurality of rollers when the crane counterweight is lowered, the plurality of rollers rolling along the plurality of inclined bars such that the counterweight is moved away from the crane upperworks.

According to a third aspect of the present invention, there is provided a method of removing a crane counterweight from a crane upperworks, including the following steps: lowering the counterweight to the crane carrier deck; and moving the counterweight longitudinally away from the crane upperworks to a position on the crane carrier deck where the crane upperworks is allowed to freely rotate past the counterweight.

The counterweight installation and removal apparatus and method of the present invention allows a truck-mounted crane to install and remove its own counterweight. Also, the apparatus allows the counterweight to be positioned on the crane carrier deck, thereby eliminating the need for maneuvering the crane to the counterweights' location. Furthermore, when the counterweight is removed from the crane the crane upperworks has clearance to move past the counterweight.

The invention itself, together with further advantages, will best be understood by reference to the following detailed description, taken in conjunction with the accompanying drawings.

DETAILED DESCRIPTION OF THE DRAWINGS AND THE PRESENTLY PREFERRED EMBODIMENTS

Figure 1:
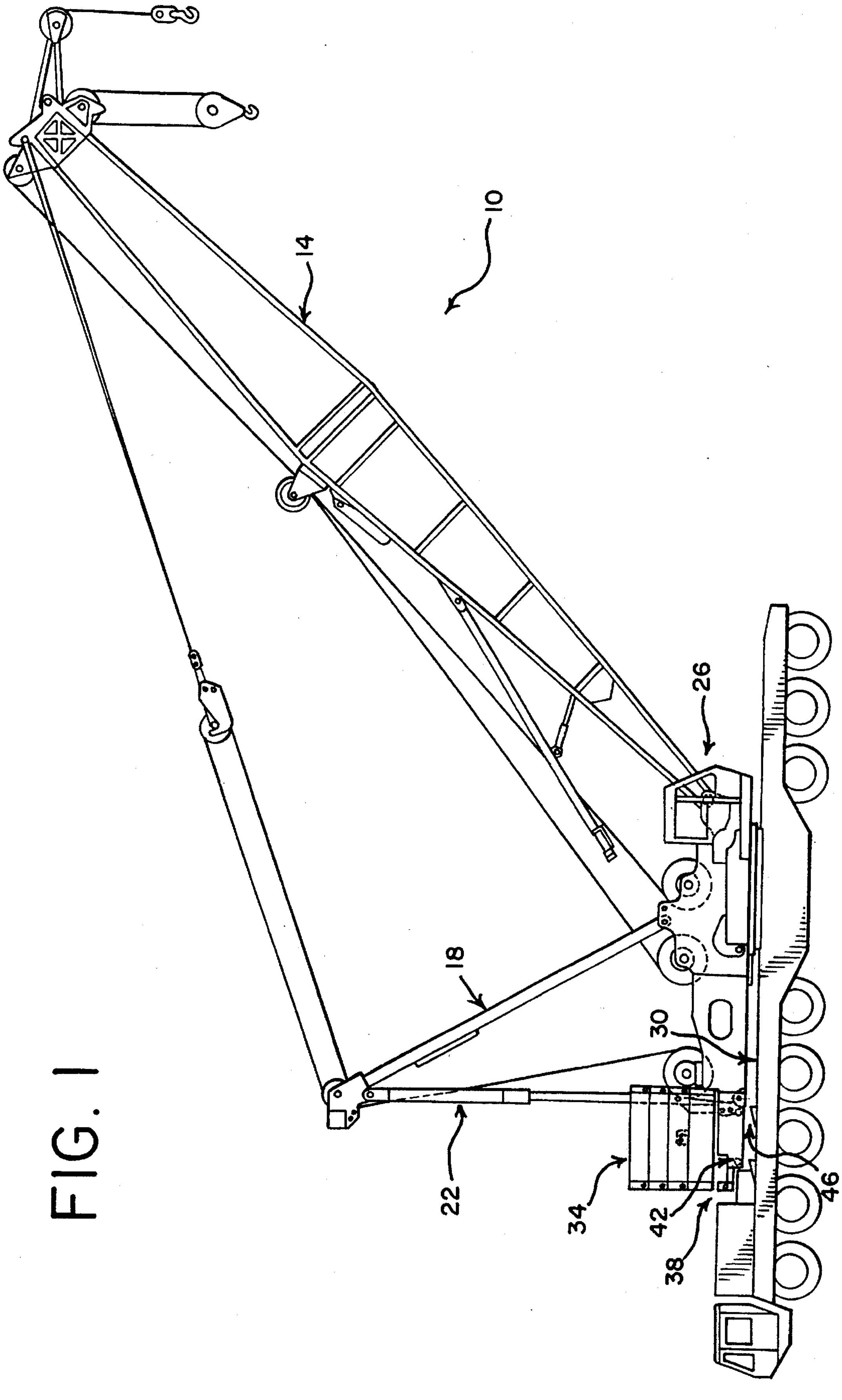
FIG. 1 is an elevational view of a crane incorporating the presently preferred embodiment of the counterweight installation and removal apparatus of the present invention.

As shown in FIG. 1, a truck-mounted crane 10 includes a boom 14, a gantry 18, a backhitch 22, an upperworks 26 and a carrier deck 30. A counterweight 34 is supported upon the rear of the crane upperworks 26 by means of supporting pins (not shown). The counterweight 34 stabilizes the crane 10 when large loads are being lifted and maneuvered.

Figure 15:
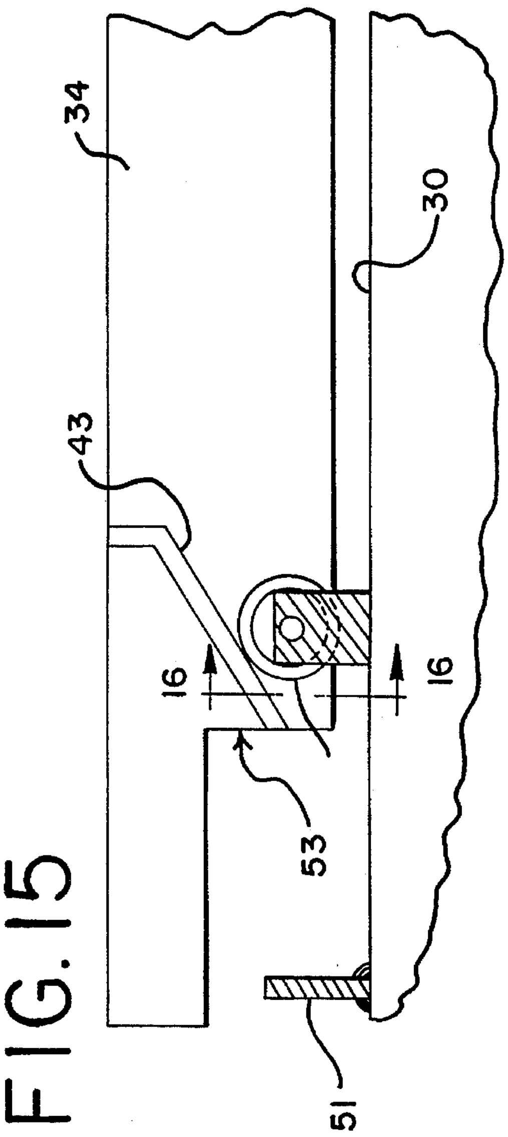
FIG. 15 is an enlarged view of an alternate embodiment of the counterweight rollers and inclined bars of the present invention.
Figure 16:
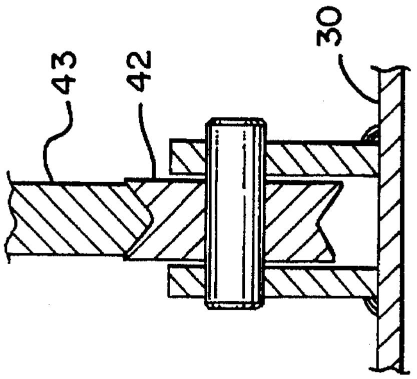
FIG. 16 is a cross-sectional view taken along line 16—16 of FIG. 15.

The counterweight installation apparatus of the present invention includes one or more inclined surfaces disposed upon the bottom of the counterweight 34 or upon the crane carrier deck 30 to engage a plurality of rollers. Preferably, two inclined surfaces are provided by the top surfaces of two sets of inclined bars. In the preferred embodiment shown in FIGS. 3–5 (which shows only one member of each set of inclined bars and rollers since it is a side view), a plurality of rollers 42 are attached to the bottom surface of the counterweight 34 and a plurality of inclined bars 46 are disposed upon the crane carrier deck 30 and positioned to engage the plurality of rollers 42 when the counterweight 34 is lowered to the carrier deck 30. Alternately, however, as shown in FIGS. 15 and 16, a plurality of inclined bars 43 may be attached to the bottom of the counterweight 34 and the plurality of rollers 42 may be disposed upon the carrier deck 30.

When the counterweight 34 is lowered from the crane upperworks 26, the rollers 42 engage the inclined bars 46. In the preferred embodiment, the weight of the counterweight 34 causes the counterweight 34 to travel along the inclined bars 46 such that it moves down and away from the crane upperworks 26. Alternately, other means for moving the counterweight 34 along the inclined bars 46 may be employed. The counterweight 34 travels to a position on the carrier deck 30 which affords sufficient clearance between the counterweight 34 and the crane upperworks 26 to allow the crane upperworks 26 to rotate freely past the removed counterweight 34.

Any suitable stopping mechanism may be positioned on the crane carrier deck 30 or the counterweight 34 to stop the counterweight 34 at a predetermined location on the crane carrier deck 30. Preferably, however, the stopping mechanism comprises a stop plate 50 (FIG. 4) attached to the counterweight 34. The stop plate 50 engages the front face 54 of at least one inclined bar 46 to stop the movement of the counterweight 34 away from the crane upperworks 26. In the alternate embodiment shown in FIGS. 15 and 16, a stop plate 51 is attached to the crane carrier deck 30. The stop plate 51 engages a front face 53 of the counterweight 34 to stop the movement of the counterweight 34 away from the crane upperworks 26.

The method of removing the crane counterweight 34 from the crane upperworks 26 includes lowering the counterweight 34 to the crane carrier deck 30, and then moving the counterweight 34 longitudinally away from the crane upperworks 26 to a position on the carrier deck 30 where the counterweight 34 is able to freely rotate past the crane upperworks 26. Detailed steps of the preferred embodiment are best explained in view of FIGS. 1–3 and 6.

Figure 2:
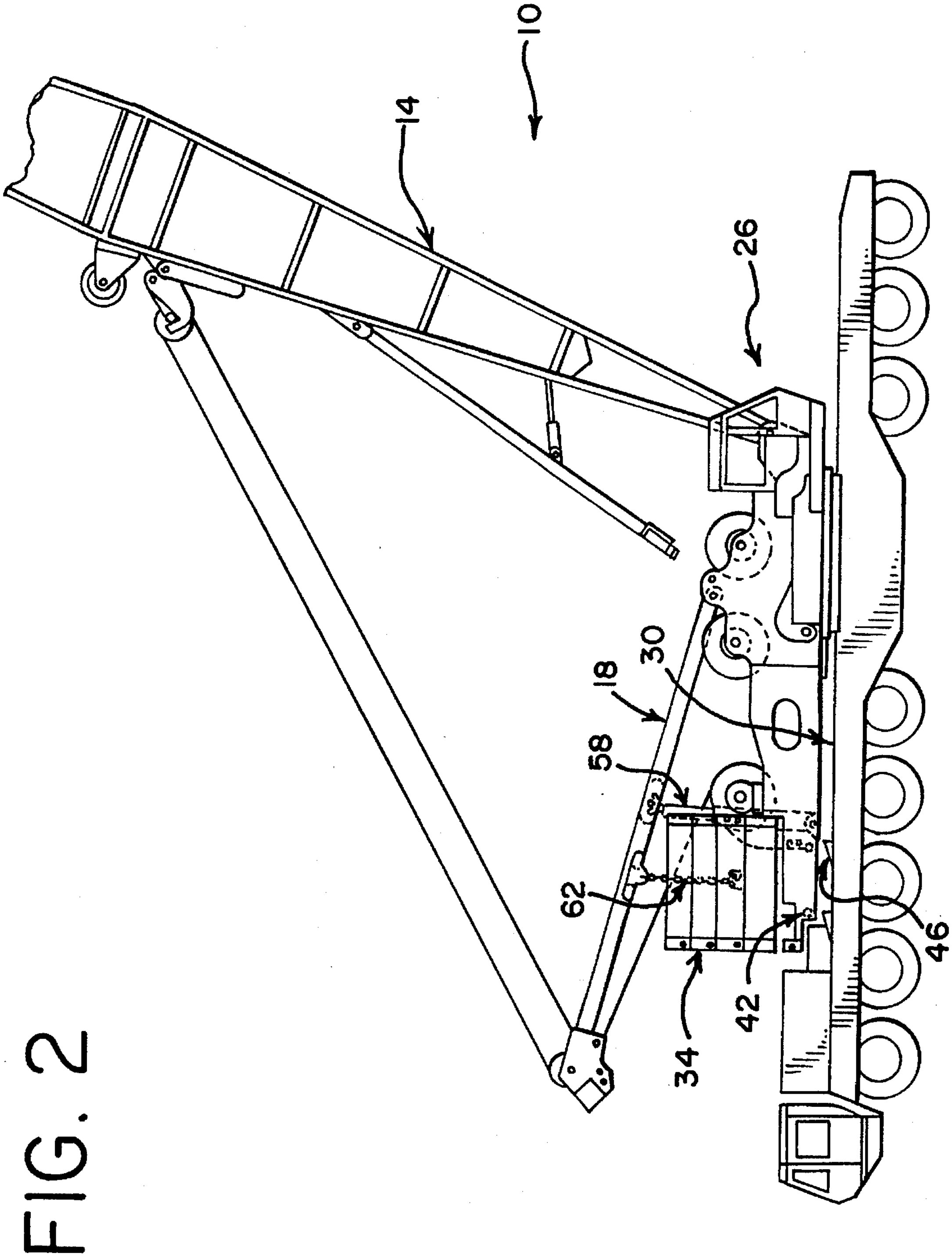
FIG. 2 is an elevational view of the crane of FIG. 1 showing the handling linkage attached to the counterweight and the gantry resting atop the gantry cylinders.
Figure 3:
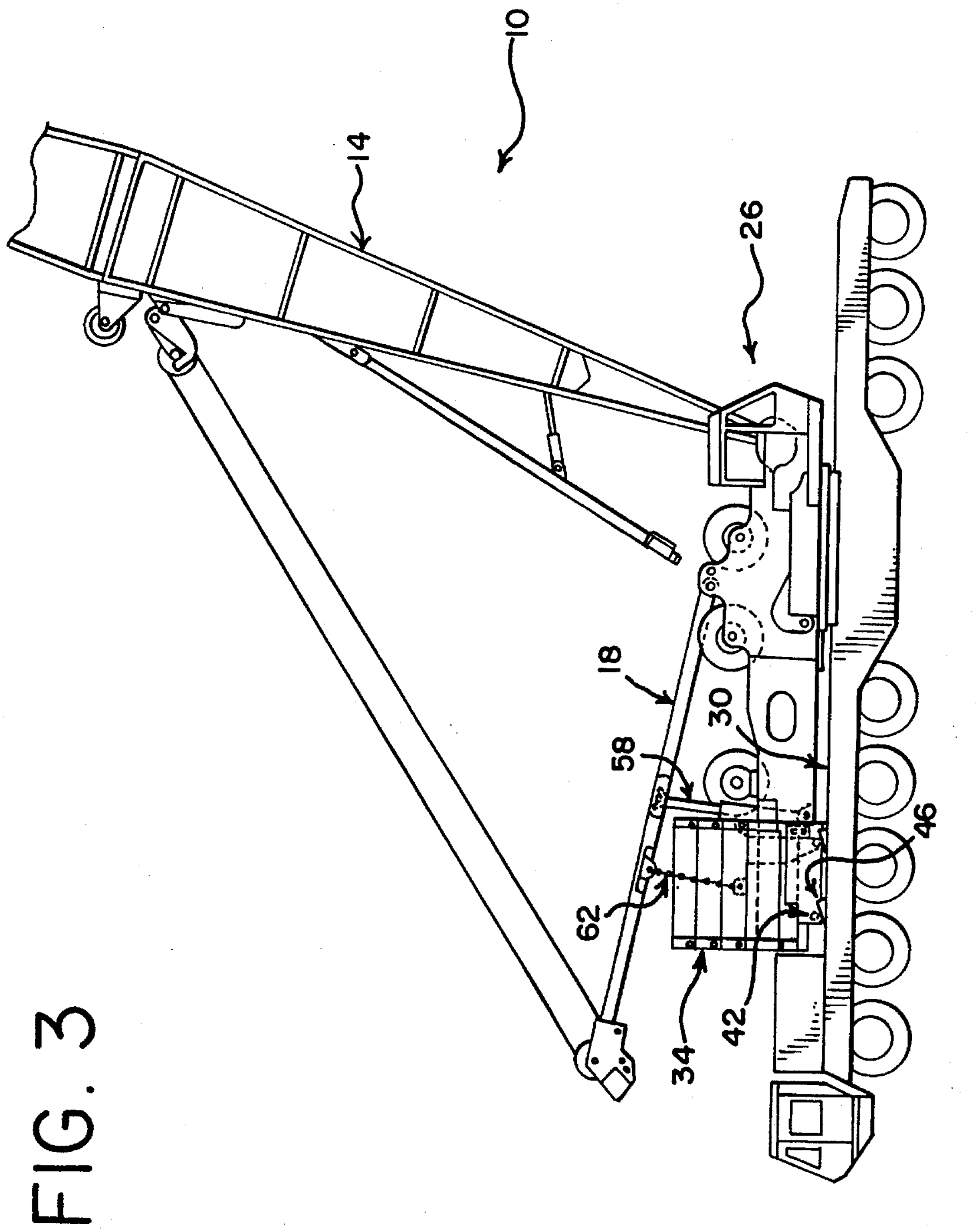
FIG. 3 is an elevational view of the crane of FIG. 1 showing the counterweight lowered to a position where the counterweight rollers engage the inclined bars.

FIG. 1 shows the crane 10 in a normal operating mode. The counterweight 34 is supported upon the rear of the crane upperworks 26 by means of supporting pins (not shown). In the preferred embodiment of the present invention, in order to remove the counterweight 34, the gantry 18 is lowered until it rests upon a plurality of gantry cylinders 58, as shown in FIG. 2. After the gantry 18 is lowered, a handling linkage 62 attached to the gantry 18 is connected to the counterweight 34. The gantry cylinders 58 are then extended until the weight of the counterweight 34 is lifted from the supporting pins (not shown). Once this is done, the supporting pins are retracted, leaving the weight of the counterweight 34 supported by the gantry 18 and the gantry cylinders 58. As shown in FIG. 3, the gantry cylinders 58 are retracted, and thus the gantry 18 is lowered, until the rollers 42 attached to the bottom of the counterweight 34 engage the inclined bars 46 mounted on the carrier deck 30. The weight of the counterweight 34 causes the counterweight 34 to travel along the inclined bars 46 until the counterweight 34 is sufficiently far from the crane upperworks 26 to allow the crane upperworks 26 to rotate freely. The handling linkage 62 is then disconnected from the counterweight 34.

Figure 6:
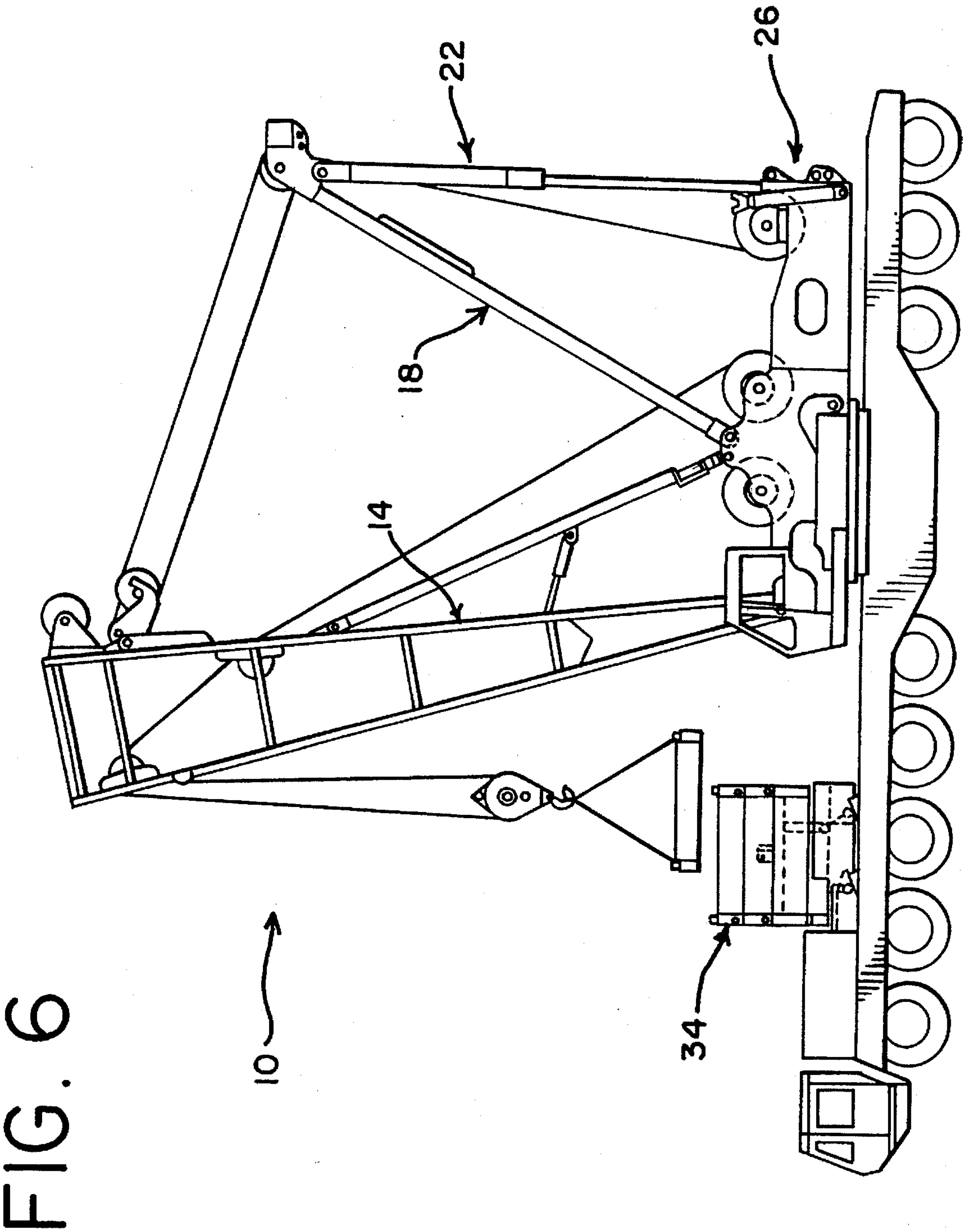
FIG. 6 is an elevational view of the crane of FIG. 1 showing the counterweight in its removed position and the crane lifting one of the individual counterweight sections.

After the counterweight 34 is removed from the crane upperworks 26, it may be removed from the crane carrier deck 30, if so desired. As shown in FIG. 6, the crane 10 can be rotated to a position where it can remove the individual sections of the counterweight 34 and place them, for example, on the ground, on a trailer for transport to another jobsite, or on another crane.

Installation of the counterweight 34 may proceed in a reverse sequence of the preferred removal process described above. The gantry 18, via the gantry cylinders 58, is lowered and the handling linkage 62 is connected to the counterweight 34. The gantry cylinders 58 are extended, thereby raising the gantry 18 and, first, moving the counterweight along the inclined bars 46 and, then, raising the counterweight into the air. The counterweight 34 is raised to the position at which the counterweight 34 is supported upon the crane upperworks 26. At this location, the supporting pins (not shown) are extended into supporting holes located in the counterweight 34. The gantry cylinders 58 are then slightly retracted such that the total weight of the counterweight 34 is supported by the supporting pins. The handling linkage 62 is then disconnected from the counterweight 34, the gantry 18 is raised to its normal operating position and the gantry cylinders 58 are totally retracted.

Any suitable number of rollers 42 and inclined bars 46 may be used in the counterweight installation apparatus 38 of the present invention. Preferably, however, there are four rollers 42 and two sets of matching inclined bars 46, each set preferably containing two inclined bars. Each set of inclined bars 46 define an inclined surface such that, in the preferred embodiment, there are two parallel inclined surfaces on the carrier deck 30. The rollers 42 and the inclined bars 46 may have flat matching surfaces. Preferably, however, to provide the counterweight 34 with side-to-side alignment, the rollers 42 are V-shaped and the inclined bars 46 are shaped to cooperate with the V-shaped rollers 42 (See FIG. 5). The gantry cylinders 58 and the supporting pins may be powered by any suitable control means, including hydraulic means. Preferably, though, the gantry cylinders 58 are hydraulically-powered and the supporting pins are pneumatically-powered. Furthermore, the use of two gantry cylinders 58 is preferred.

Figure 7:
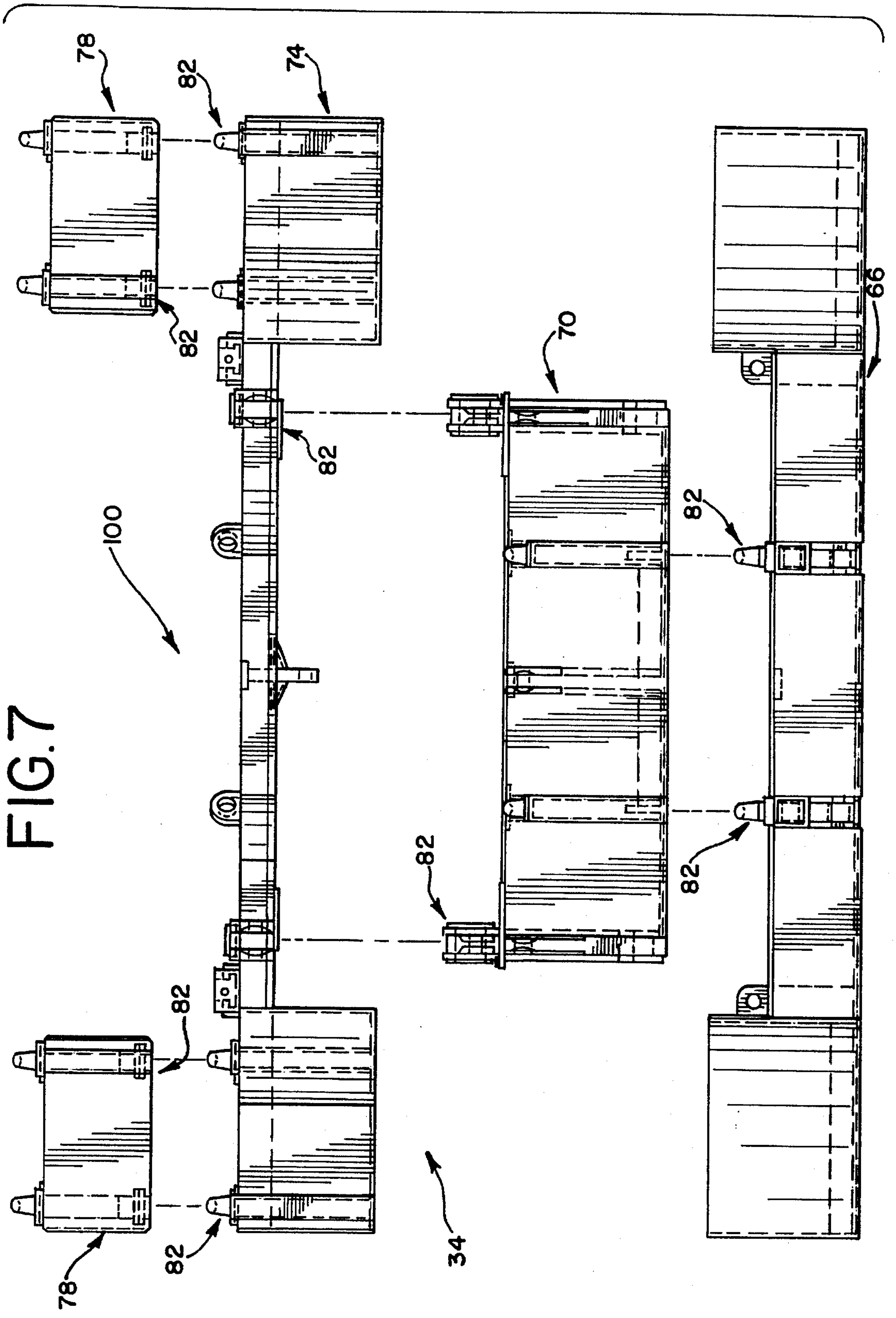
FIG. 7 is an exploded view showing the individual sections of the counterweight.

The preferred configuration of the counterweight 34 is shown in FIGS. 7–14. As shown in FIG. 7, the counterweight 34 comprises a number of individual counterweight sections, including a bottom counterweight section 66, a middle counterweight section 70, a top counterweight section 74 and any suitable number of side counterweight sections 78. The individual counterweight sections 66, 70, 74, 78 are preferably interconnected so that all of the sections may be raised and lowered as one counterweight 34. The individual counterweight sections 66, 70, 74, 78 may be interconnected in any suitable manner. However, a counterweight connector 82 is the preferred connector means.

Figure 8:
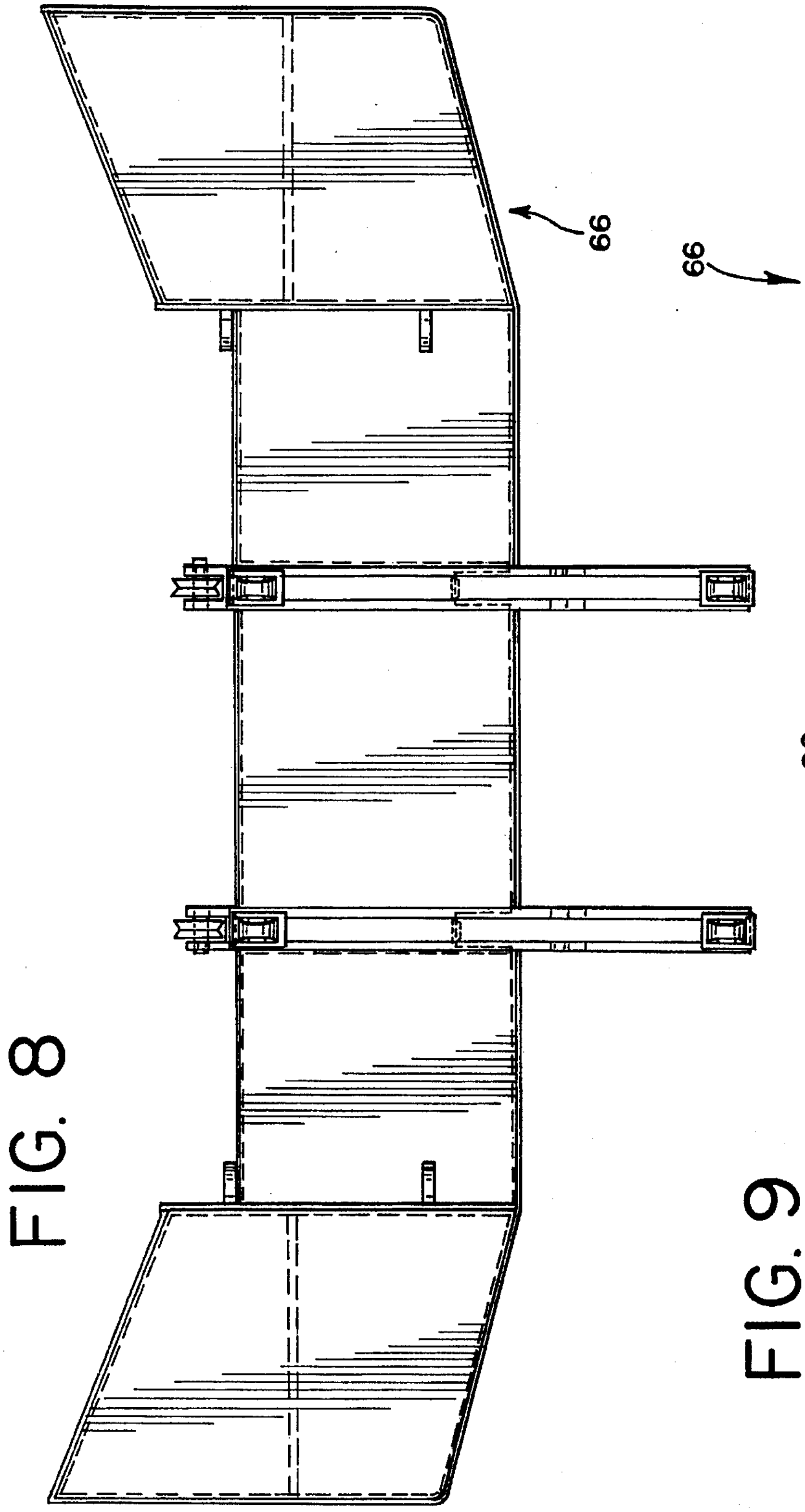
FIG. 8 is a plan view of the bottom counterweight section shown in FIG. 7.
Figure 9:
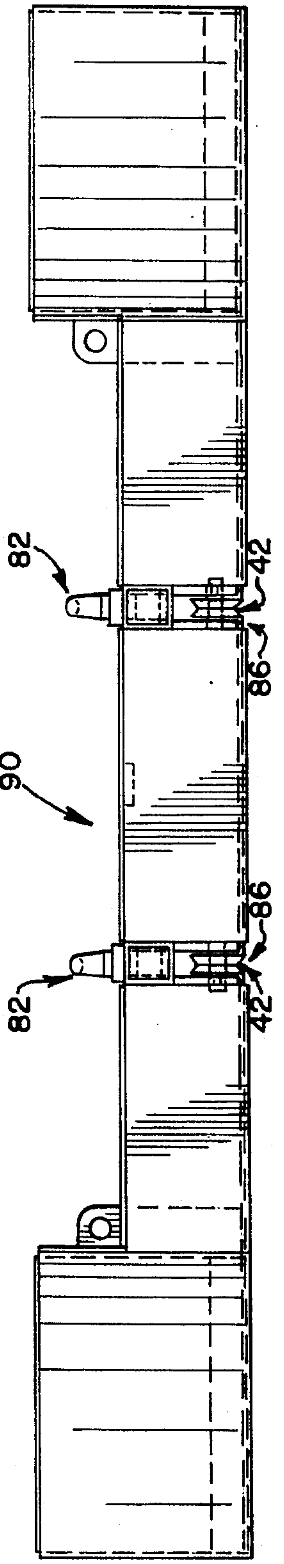
FIG. 9 is a side view of the bottom counterweight section shown in FIG. 8.

FIGS. 8 and 9 show plan and side views, respectively, of the bottom counterweight section 66. As shown in FIG. 9, the rollers 42 are attached to this section of the counterweight 34. A cavity 86 is defined in the bottom counterweight section 66 to accommodate the inclined bars 46.

Figure 10:
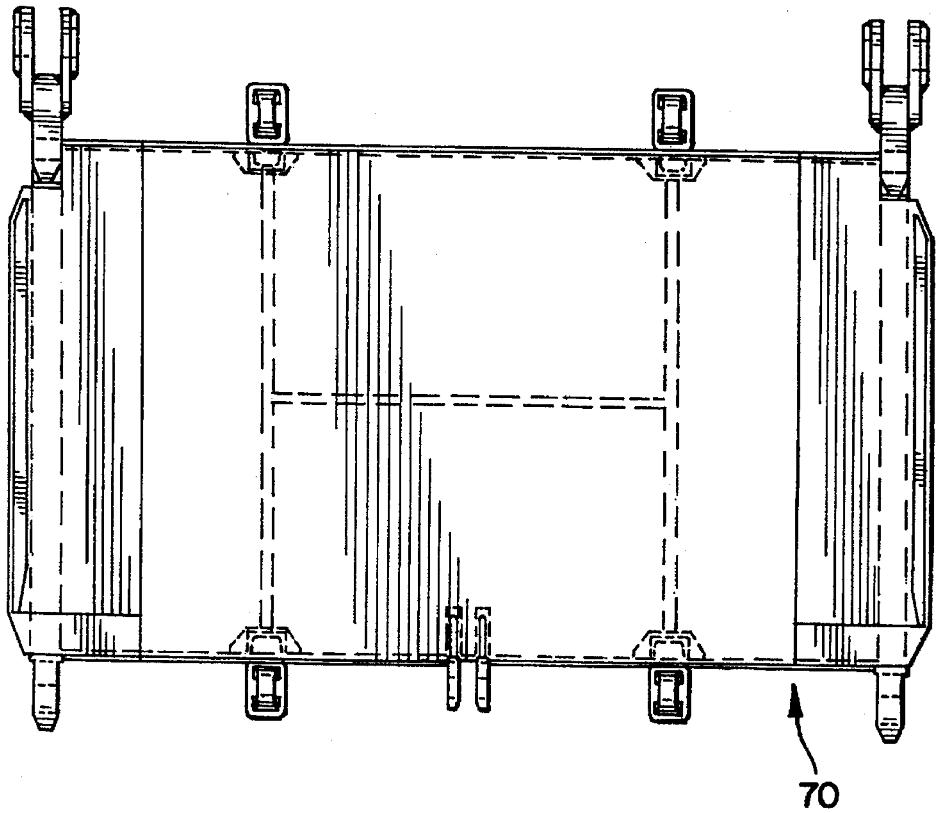
FIG. 10 is a plan view of the middle counterweight section shown in FIG. 7.
Figure 11:
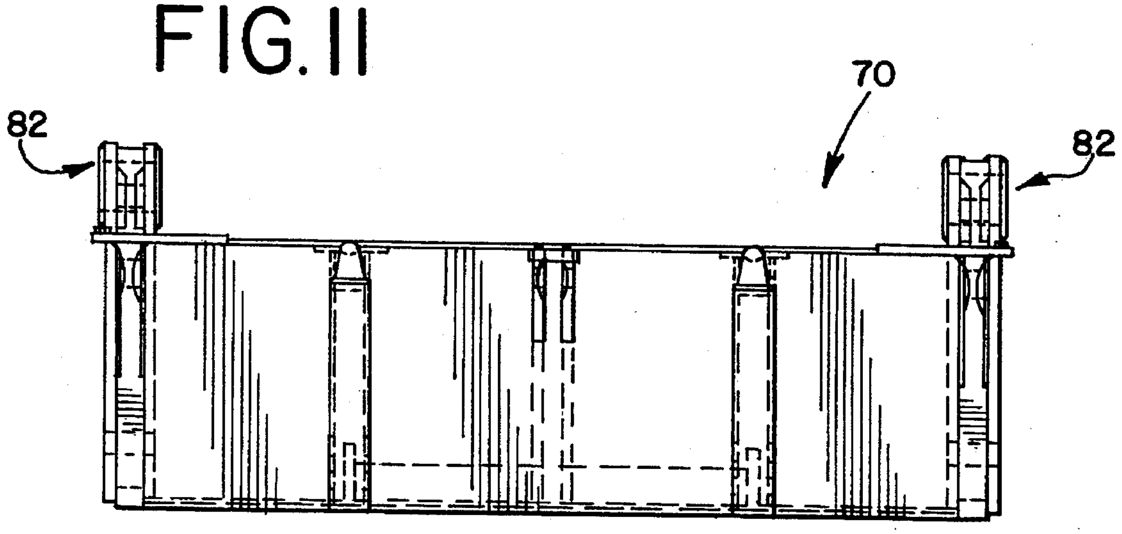
FIG. 11 is a side view of the middle counterweight section shown in FIG. 10.

FIGS. 10 and 11 show plan and side views, respectively, of the middle counterweight section 70. As shown in FIG. 7, the middle counterweight section 70 fits within the base portion 90 (FIGS. 7 and 9) of the bottom counterweight section 66.

Figure 12:
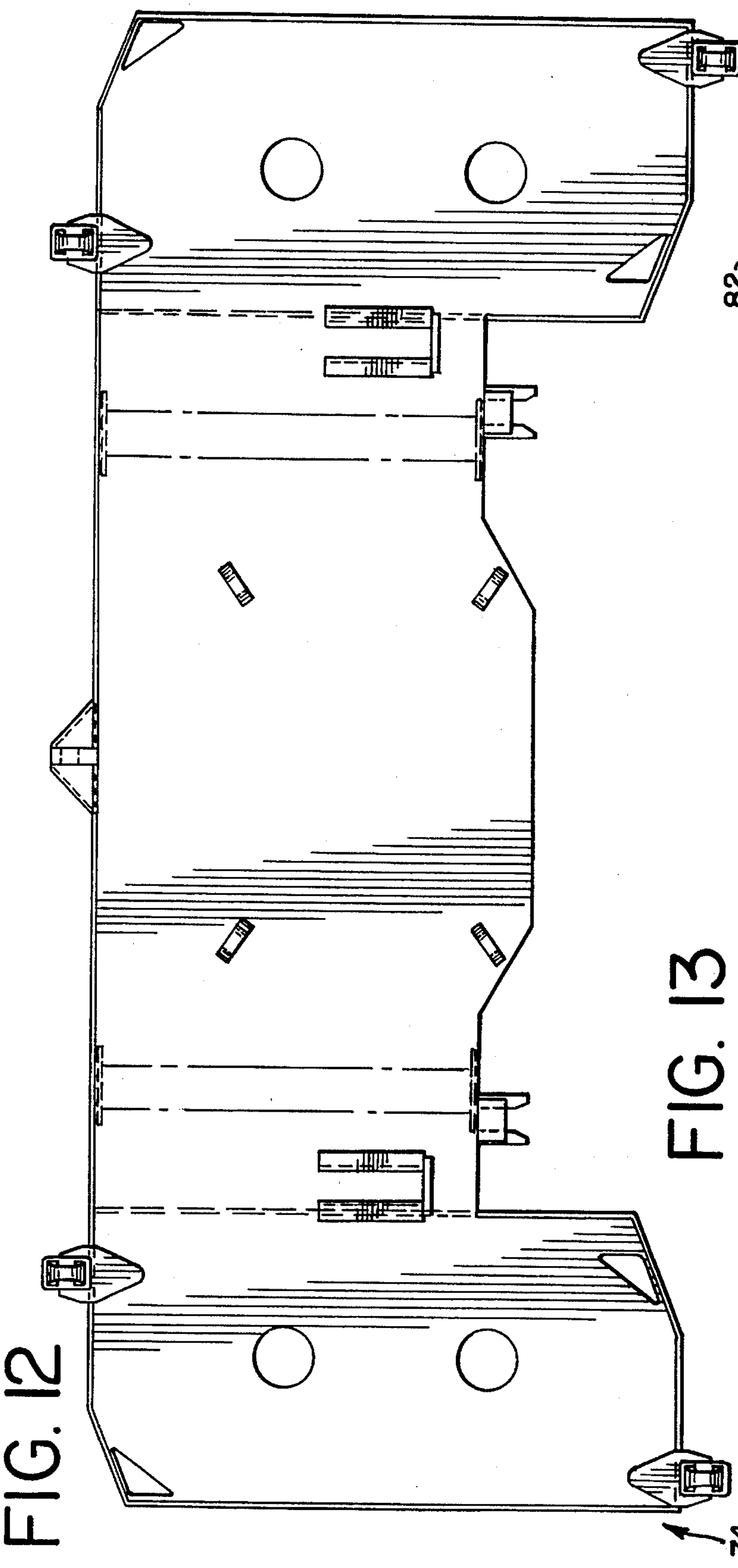
FIG. 12 is a plan view of the top counterweight section shown in FIG. 7.
Figure 13:
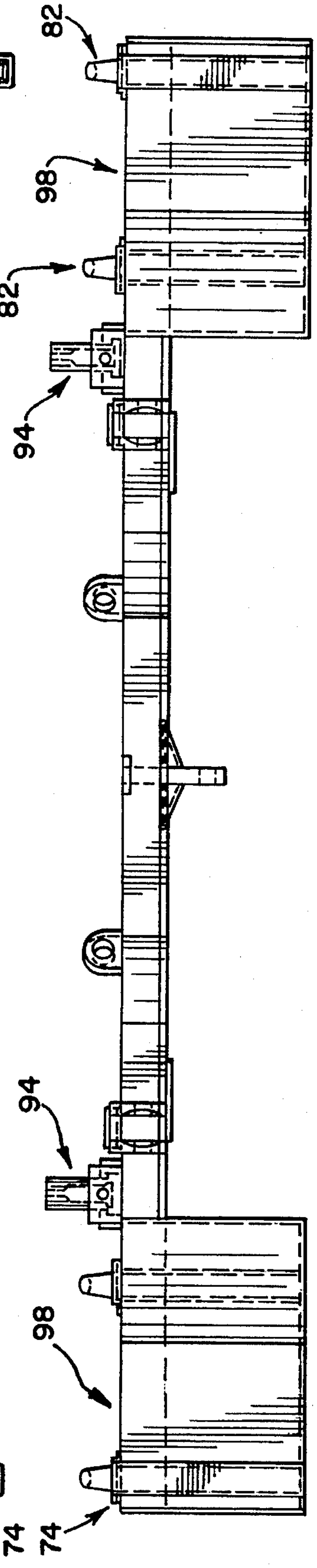
FIG. 13 is a side view of the top counterweight section shown in FIG. 12.

FIGS. 12 and 13 show plan and side views, respectively, of the top counterweight section 74. As shown in FIG. 7, the top counterweight section 74 rests above and partially around the middle counterweight section 70. To raise and lower the counterweight 34, as previously discussed, the handling linkage 62 is connected to brackets 94 located on the top side of the top counterweight section 74.

Figure 14:
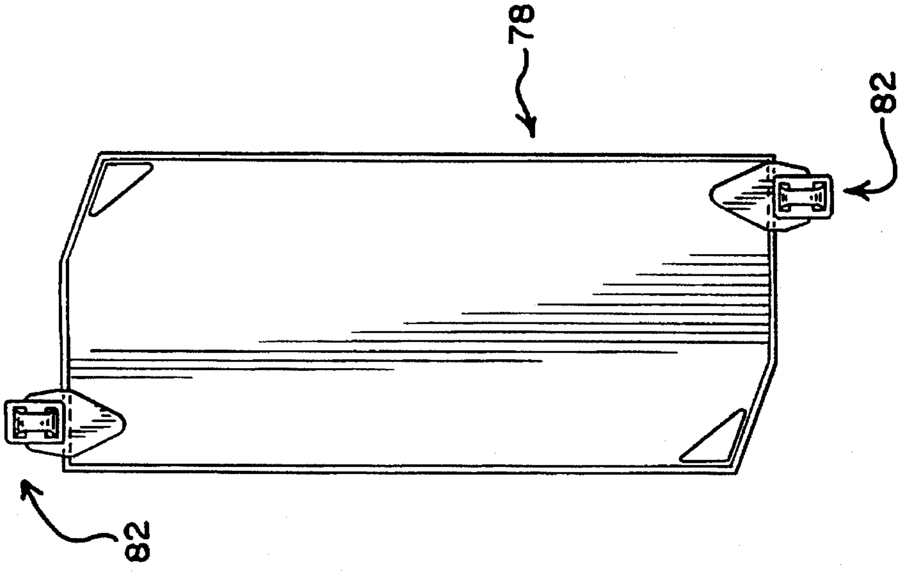
FIG. 14 is a plan view of a side counterweight section shown in FIG. 7.

FIG. 14 shows a plan view of a side counterweight section 78. As shown in FIG. 7, a number of side counterweight sections 78 may be placed atop one another on the side portions 98 (FIG. 13) of the top counterweight section 74. The side counterweight sections 78 and the top side of the top counterweight section 74 define a recess 100 (FIG. 7) in which the gantry 18 rests when it is lowered, i.e., when the crane 10 is moved to another jobsite.

Figure 4:
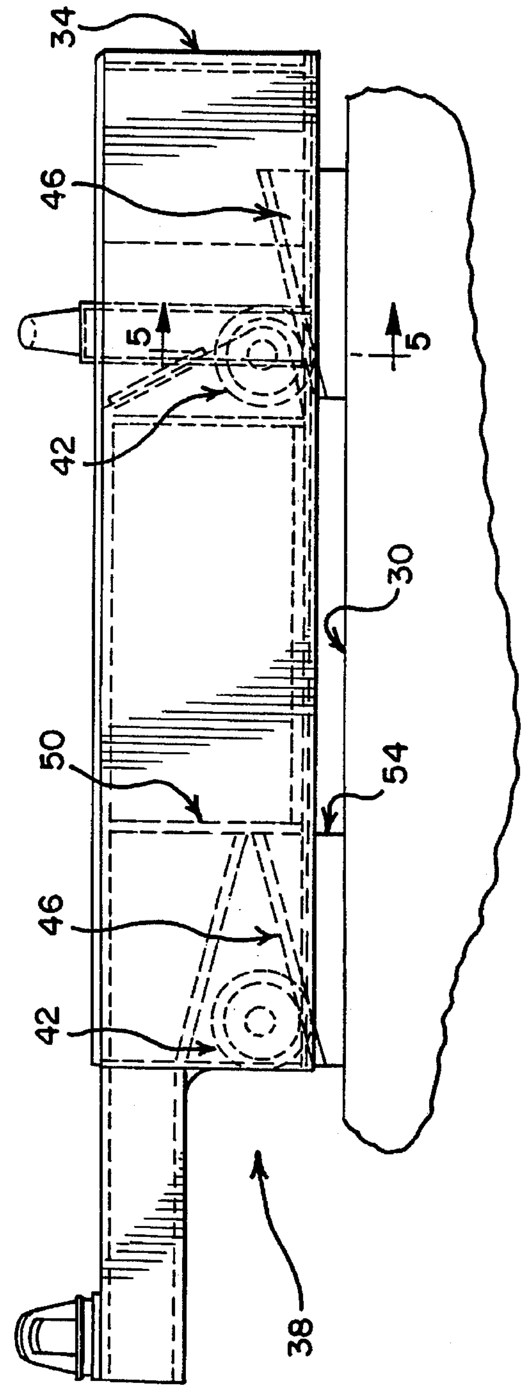
FIG. 4 is an enlarged view of the counterweight rollers and the inclined bars of FIG. 3.
Figure 5:
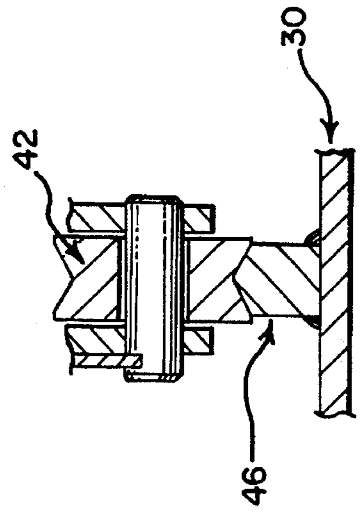
FIG. 5 is a cross-sectional view taken along line 5—5 of FIG. 4.

It should be noted that crane gantries typically have two gantry legs positioned adjacent one another on a crane bed. Also, it should be understood that, while FIG. 4 shows only two roller and inclined bar assemblies positioned side-by-side, the present invention includes any suitable number of such assemblies extending into and along the Figure.

The counterweight installation and removal apparatus 38 of the present invention allows a truck-mounted crane 10 to install and remove its own counterweight 34. Furthermore, the apparatus 38 allows the counterweight 34 to be positioned on the crane carrier deck 30, thereby eliminating the need for maneuvering the crane 10 to the counterweights' 34 location. The removed counterweight 34 provides clearance for the crane upperworks 26 to rotate freely past the counterweight 34.

Additionally, it should be appreciated that the counterweight installation apparatus 38 of this invention may include as many of the above-described elements as appropriate for the application. The embodiment described above is to be considered in all respects as illustrative and not restrictive. The scope of the invention is indicated by the following claims rather than by the foregoing description. All changes which come within the meaning and range of equivalency of the claims are to embraced within their scope.

We claim:

1. A truck-mounted crane comprising:

a) a crane carrier deck;

b) a plurality of tires supporting said carrier deck;

c) a ring bearing mounted on said crane carrier deck;

d) a crane upperworks rotatably supported on said crane carrier deck by said ring bearing;

e) a gantry connected to said crane upperworks, said gantry comprising a handling linkage;

f) a backhitch connected to said crane upperworks;

g) a boom connected to said crane upperworks;

h) a counterweight having a bottom surface, said counterweight being removably supported on said crane upperworks, the handing linkage being removably connected to said counterweight;

i) a plurality of rollers attached to the bottom surface of said counterweight;

j) at least two inclined bars positioned on said crane carrier deck to engage said plurality of rollers, said at least two inclined bars each being inclined with respect to said crane carrier deck at an angle sufficient to cause said counterweight to roll therealong under the influence of gravity when said counterweight is positioned on said at least two inclined bars and said crane carrier deck is substantially horizontal; and k) a stopping mechanism attached to said counterweight, said stopping mechanism being positioned to stop said counterweight from rolling off said at least two inclined bars at a position on said crane carrier deck where said crane upperworks is allowed to freely rotate past said counterweight.

2. The crane of claim 1 wherein the rollers have V-shaped surfaces to provide the counterweight with side-to-side alignment.

3. The crane of claim 1 wherein the counterweight comprises a plurality of counterweight sections.

4. The crane of claim 1 wherein the stop mechanism comprises a stop plate located so as to engage said at least two inclined bars to stop the movement of the counterweight.

5. The crane of claim 1 further comprising at least one powered gantry cylinder mounted on said crane upperworks for raising and lowering said gantry.

6. A truck-mounted crane comprising:

a) a crane carrier deck;

b) a crane upperworks rotatably supported on said crane carrier deck;

c) a lead support boom connected to said crane upperworks;

d) a counterweight removably supported on said crane upperworks for counterbalancing a lead supported by said boom, said counterweight having a bottom surface;

e) a gantry connected to said crane upperworks and comprising a handling linkage removably connected to said counterweight whereby the counterweight may be raised and lowered;

f) a plurality of rollers attached to either the bottom surface of said counterweight or said crane carrier deck; and g) a structure forming at least one surface that is inclined relative to said crane carrier deck, said at least one inclined surface being mounted on the other of said either bottom surface of said counterweight or said crane carrier deck to engage said plurality of rollers when said counterweight is removed from said crane upperworks and placed on said crane carrier deck, said at least one inclined, surface being inclined with respect to said crane carrier deck at an angle sufficient to cause said counterweight to roll therealong under the influence of gravity away from said crane upperworks when said counterweight is supported on said crane carrier deck and said crane carrier deck is substantially horizontal.

7. The crane of claim 6 further comprising at least one powered gantry cylinder mounted on said upperworks for raising and lowering said gantry.

8. The crane of claim 6 wherein said plurality of rollers are attached to the bottom surface of said counterweight and said at least one inclined surface is positioned on said crane carrier deck.

9. The crane of claim 6 wherein said plurality of rollers are attached to said crane carrier deck and said at least one inclined surface is positioned on the bottom surface of said counterweight.

10. The crane of claim 6 wherein the counterweight comprises a plurality of counterweight sections.

11. The crane of claim 6 wherein the rollers have V-shaped surfaces to provide the counterweight with side-to-side alignment.

12. The crane of claim 6 further comprising a stopping mechanism for stopping the movement of said counterweight at a predetermined location along said at least one inclined surface.

13. The crane of claim 12 wherein the predetermined location permits said crane upperworks to freely rotate past said counterweight when said counterweight is located at the predetermined location.

14. The crane of claim 12 wherein the stopping mechanism comprises a stop plate attached to the counterweight.

15. The crane of claim 14 wherein the at least one inclined surface includes a plurality of inclined bars mounted on the crane carrier deck and the stop plate is located to engage said plurality of inclined bars to stop the movement of said counterweight.

* * * * *

UNITED STATES PATENT AND TRADEMARK OFFICE

CERTIFICATE OF CORRECTION

PATENT NO. : 5,615,784
DATED : April 1, 1997
INVENTOR(S) : David Pech et al.

It is certified that error appears in the above-identified patent and that said Letters Patent is hereby corrected as shown below:

In column 5, line 60, after "to" insert --be--.

In the Claims

In claim 1, line 13, replace "handing" with --handling--.

In claim 6, line 5, replace "lead" with --load--.

In claim 6, line 8, replace "lead" with --load--.

In claim 6, line 25, delete "," after the first occurrence of "inclined".

Signed and Sealed this

Eighth Day of June, 1999

Attest:

Q. TODD DICKINSON

Attesting Officer

*Acting Commissioner of Patents and Trademarks*